United States Patent [19]

Schneider

[11] 3,853,268

[45] Dec. 10, 1974

[54] TEMPERATURE RESPONSIVE VALVES

[75] Inventor: Friedrich Schneider, Pforzheim, Germany

[73] Assignee: G. Rau, Pforzheim, Germany

[22] Filed: Sept. 10, 1973

[21] Appl. No.: 395,453

Related U.S. Application Data

[62] Division of Ser. No. 231,146, March 2, 1972, Pat. No. 3,799,432.

[30] Foreign Application Priority Data

Mar. 11, 1971 Germany............................ 2111667

[52] U.S. Cl........... 236/48 R, 137/625.33, 236/101, 251/75
[51] Int. Cl. ......................................... G05d 23/10
[58] Field of Search....................236/101, 48 R; 137/625.33; 251/75

[56] References Cited

UNITED STATES PATENTS

| | | | |
|---|---|---|---|
| 963,463 | 7/1910 | Mueller.......................... | 137/625.33 |
| 1,848,031 | 3/1932 | Spencer............................. | 236/101 |
| 1,923,882 | 8/1933 | Pickup......................... | 236/101 UX |

Primary Examiner—Edward G. Favors
Attorney, Agent, or Firm—Wenderoth, Lind & Ponack

[57] ABSTRACT

The invention is concerned with a temperature-responsive valve in which a valve part movable between open and closed positions controls the flow of a medium through the valve and in which such opening and closing movement of the valve part is effected by means of at least one plate-like bimetal snap-action element responsive to the temperature of the medium. The element is clamped at its periphery and as a whole is substantially uniformly domed or dished.

3 Claims, 9 Drawing Figures

TEMPERATURE RESPONSIVE VALVES

This is a division of application Ser. No. 231,146, now U.S. Pat. No. 3,799,432, filed Mar. 2, 1972.

The present invention relates to a temperature responsive valve, especially for regulating the flow of a coolant in internal-combustion engines.

Many forms of temperature-responsive valves for regulating the flow of a coolant in internal-combustion engines are known in which the movement of a valve part is initiated by an element comprising an expansible material. This element consists of a gas-tight high-pressure capsule which functions as a temperature sensor and is filled with a wax-like expansible material. Upon passing from the solid to the liquid phase, an expansible material of this kind increases in volume to such an extent that the change in volume can be transmitted to a plunger which acts as the drive means for displacing a valve part. Suitable choice of the expansible material renders it possible to cause the valve to respond at different temperatures. When the expansible material is heated to beyond the temperature at which it liquifies, an increase or reduction in the cross-section of a flow passage in the valve may be achieved that is approximately proportional to the temperature change so that a proportional characteristic curve can be achieved in known valves of this kind. The disadvantages associated with this form of valve reside largely in the difficulties in sealing off the high-pressure capsule filled with expansible material, particularly at the region where the plunger is guided. A further disadvantage is the resultant high labour and material costs.

Bimetal elements for controlling temperature-responsive valves are likewise known in many forms. However, the object of a system of this kind is to provide a control that is continuously regulated by the bimetal element and in some cases varies linearly with temperature.

The object of the present invention is to provide a temperature-responsive valve which is actuated at a definite operating temperature, is responsive to the temperature of the medium flowing through the valve, and is of particularly simple design so that it can be used as a basic element for a very wide variety of additional forms of valves.

According to the invention there is provided a temperature-responsive valve comprising a valve part movable between an open position to allow passage of a medium through the valve and a closed position to prevent passage of the medium through the valve, and at least one plate-like bimetal snap-action element responsive to the temperature of the medium to effect said opening and closing movement of the valve part, said element being clamped at its periphery and being as a whole substantially uniformly domed or dished.

The use of such a bimetal snap-action element results in a simple and less expensive construction which does not require the additional sealing means necessary in the case of an element incorporating an expansible material and which is capable of applying considerable force to the movable valve part. A further advantage of a valve constructed in accordance with the invention is that, in the event of a breakdown, the valve remains in the open position, whereas flow-control valves in which the movable valve part is moved to overcome the action of a spring by a component comprising an expansible material are pressed into the closed position when breakdown occurs, so that blockages may occur in the coolant circuits of internal-combustion engines when such valves are used.

The movable valve part may be connected to a continuously-acting bimetal element constituting an additional means for effecting opening and closing movement of the movable valve part. This enables the valve to be continuously controlled above or below its actual response temperature.

The bimetal snap-action element may expediently take the form of a disc or an appropriate strip. The use of a disc appears to be particularly advantageous since the reversal of force by way of the marginal zones and in the central zone is achieved by means of a component of simple construction.

The valve may be provided with a compensating spring element to relieve the valve of undesirable additional forces between the movable valve part and a valve part solid with the valve casing when the movable valve part is in its closed position and when a further reduction or increase in temperature occurs. Such compensating spring elements are known in the case of bimetal-controlled continuous-capacity valves. This principle can be carried out in practice by arranging for the bimetal snap-action disc to engage support means spring mounted on the valve casing.

The bimetal snap-action element may be co-operable with an adjustable bias-limiting means at least in one of the end positions of the movable valve part. The desired bias and therefore the closing force of the valve can thus be fixed in one or both such end positions.

To obtain an adequate valve closing force it may be advantageous to select an operating temperature for the bimetal snap-action element that is higher than the required operating temperature of the valve; in this case snap-action bias adjusting means may be provided to enable the valve to operate at the required temperature. Great closing forces can be achieved in this way.

When a temperature-responsive valve of this kind is used for regulating the flow of a coolant in internal-combustion engines, it appears expedient to employ an arrangement in which a relatively large flow passage can by suddenly created in the valve when the required operating temperature is reached. For this purpose, the temperature-responsive valve may be designed as a ring valve in which mutually radially offset arcuate slots are provided both in the movable valve part and in a valve part associated with the valve casing. In another preferred construction, angularly offset radial slots can be provided in a parallel or sectorial arrangement. A further preferred form of temperature-responsive valve is one wherein the bimetal snap-action disc is held at a number of points around its periphery in recesses formed in parts associated with the valve casing and carries at its central zone a guide pin which is connected to the movable valve part and is guided in a hole in a valve part associated with the valve casing, the connection between the guide pin, which is rotatable relative to the disc, and the movable valve part being a screw-threaded connection. In this form of valve, the guide pine provides a means for adjusting the bias of the disc. In another preferred form of the valve an additional element may be provided to adjust the bias of the bimetal disc when the movable valve parr is in one of its end positions.

An advantageous combination of a bimetal snap-action disc with a further bimetal snap-action element or with a continuously acting bimetal displacement means can be achieved by connecting the bimetal snap-action disc to a holder which carries a bimetal disc which acts on a continuous or sudden basis and which is connected to the movable part of the valve through a guide pin. A reverse succession of bimetal elements may be advantageous for certain applications.

In a further preferred arrangement, at least one continuously acting bimetal cup spring, carried on an adjustable longitudinally displaceable guide pin mounted in the valve casing, is arranged to be capable of displacing the bimetal snap-action disc, and these bimetal elements, freely displaceable on the guide pin, are arranged to oppose a helical compression spring, the movable valve part being suspended from the bimetal snap-action disc. Depending upon the selected sequence of the cup springs and snap-action disc as well as upon their operating temperatures and bias, there is thus obtained a valve characteristic curve whereby either an initial sudden opening followed by a proportional change in the flow passage cross-section takes place, or a proportional opening of the valve occurs prior to a sudden increase in the flow passage cross-section. A characteristic curve of this kind is particularly advantageous in the case of valves for regulating the flow of a coolant in internal-combustion engines when it is required to create a flow passage of initially small cross-section prior to complete opening of the valve to avoid sudden entry of a fairly large quantity of cold cooling water into the engine block.

A temperature responsive valve according to the invention can be manufactured at low cost as a mass-produced article and can operate in a reliable manner for a variety of purposes. Some embodiments of the invention are illustrated diagrammatically in the accompanying drawings in which.

In the drawings, like parts have been given the same reference numerals.

Figure 1:
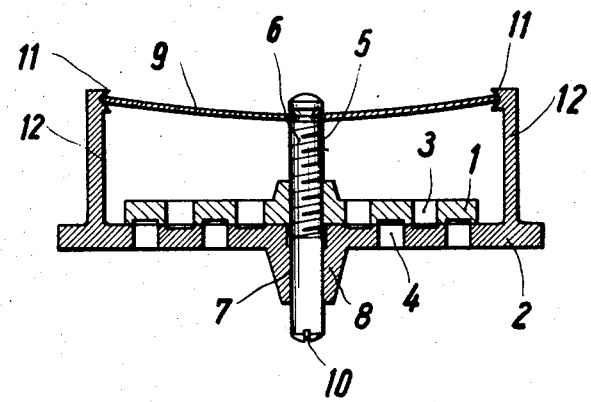
FIG. 1 is a sectional side elevation of one embodiment of a temperature-responsive valve in accordance with the invention, in the fully closed position.
Figure 2:
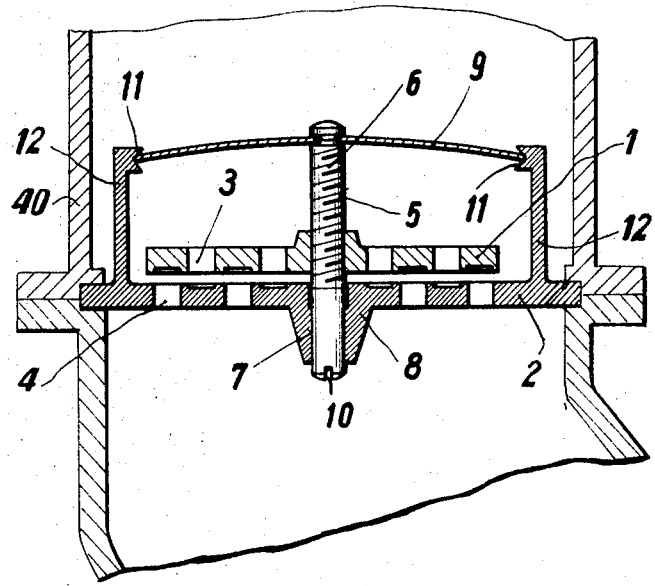
FIG. 2 is a side view of the valve of FIG. 1 in the fully open position.

FIGS. 1 and 2 illustrate a temperature-responsive valve for regulating the flow of a coolant in internal-combustion engines in which valve mutually radially offset arcuate slots 3 and 4 are provided respectively in a movable valve part 1 and a valve part 2 associated with the valve casing, the slots 3 and 4 providing for flow through the valve parts 1 and 2. The movable valve part 1 is secured to a screw-threaded portion 5 of a guide pin 6 which is guided for longitudinal displacement in a bore 7 in an attachment 8. The guide pin 6 is also rotatably mounted in the centre of a bimetal snap-action disc 9, so that the bias of the bimetal disc 9 and thus the closing force of the movable valve part 1 in the direction of the valve part 2, associated with the casing, can be adjusted. Such adjustment is effected by inserting a tool in a slot 10 provided in the lower end of the guide pin 6 and turning the tool to thus turn the pin. Because of the screw-threaded connection between the pin 6 and the valve part 1, the pin 6 when turned moves lengthwise relative to the valve part 1 and the central portion of the discs 9 is raised or lowered relative to the periphery of the disc, depending on the direction of turn, and the bias of the disc 9 is altered. The bimetal snap-action disc 9 is mounted at its periphery in straight-sided recessess 11 formed in three supports 12 associated with the valve casing and spaced 120° apart. FIG. 1 shows the fully closed position of the valve whereas FIG. 2 illustrates the valve in its fully open position.

Figure 3:
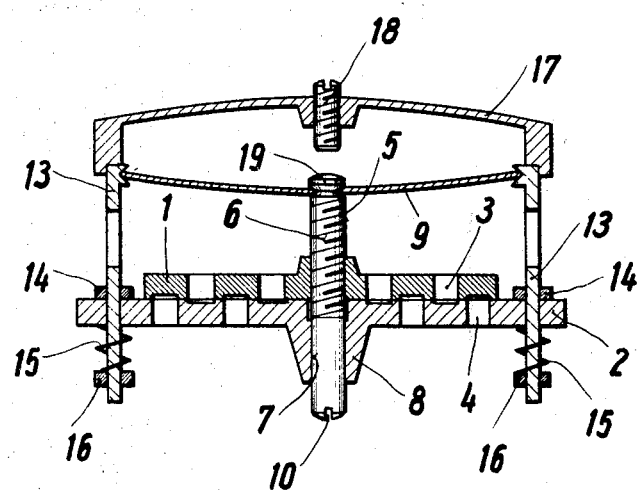
FIG. 3 is a sectional side elevation of another embodiment of a valve in accordance with the invention, the valve having an additional bias-adjusting element and being shown in the fully closed position.
Figure 4:
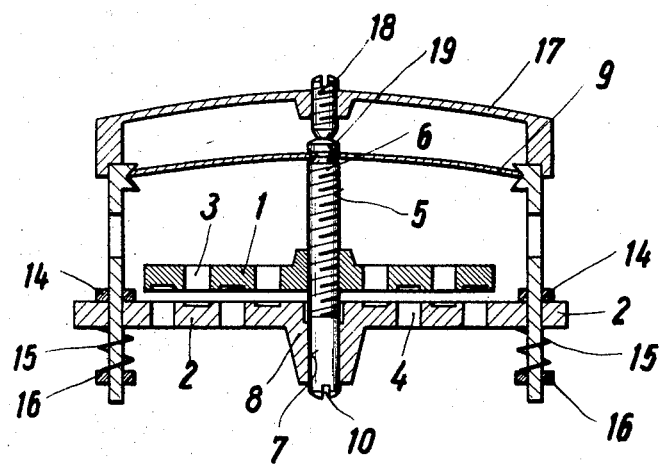
FIG. 4 is a side view of the valve of FIG. 3 in the fully open position.

The valve of FIGS. 3 and 4 has supports 13 which carry stops 14 and are displaceable against the action of compression springs 15 which bear at one end against the valve part 2 associated with the valve casing and at the other end against adjustable backing elements 16. The springs 15 are compensating springs which relieve the valve of undesirable additional forces between the movable valve part 1 and the valve part 2 solid with the valve casing when the part 1 is in its closed position and when the curvature of the disc 9 tends to increase on a further reduction or increase in temperature as the case may be. Also provided is a bowed element 17 carrying a grub screw 18 which acts as an additional bias-adjustment element and which, in the fully open position of the valve illustrated in FIG. 4, bears against the top end 19 of the guide pin 6. The screw 18 enables additional adjustment of the bias of the bimetal snap-action disc to be carried out in the fully open position of the valve.

Figure 5:
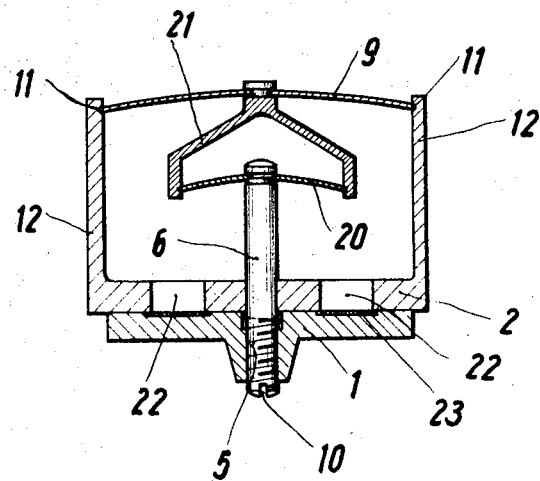
FIG. 5 is a sectional side elevation of a further embodiment of a valve in accordance with the invention, the valve having an additional bimetal element and being shown in the fully closed position.
Figure 6:
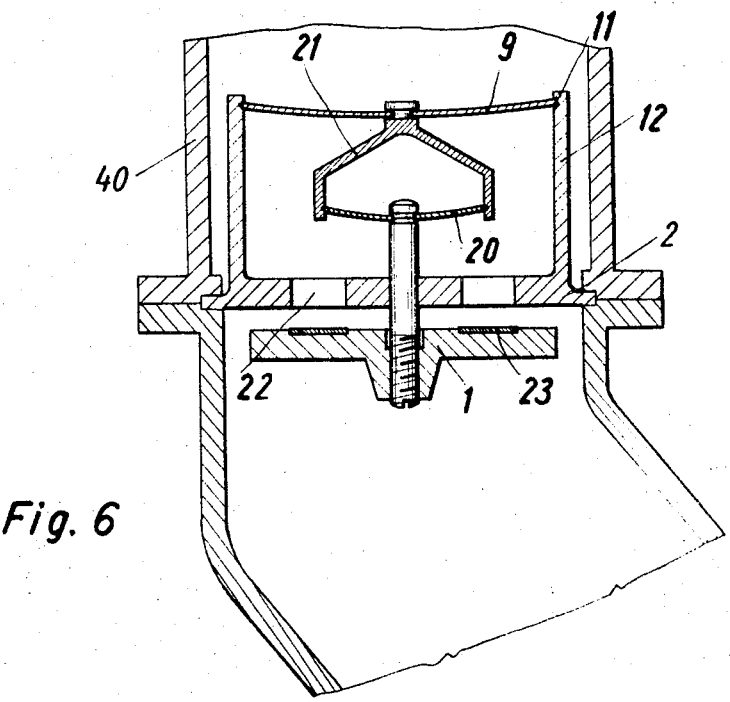
FIG. 6 is a side view of the valve of FIG. 5 in the open position.

The valve of FIGS. 5 and 6 incorporates a bimetal snap-action disc 9 combined with a continuously-acting bimetal disc 20. The valve part 2 associated with the valve casing, like the embodiment of FIGS. 1 and 2, has three supports 12 associated with the casing and spaced 120° apart, and the supports 12 are provided with straight-sided recesses 11 receiving the periphery of the bimetal snap-action disc 9. In the central zone of the bimetal snap-action disc 9 there is provided a holder 21 which supports the continuously acting bimetal disc 20 at two or more points on its periphery. The guide pin 6 is rotatably fitted in the centre of the continuously acting bimetal disc 20. The movable valve part 1 is secured to the guide pin 6 over the screw-threaded portion 5 so that bias can be adjusted by turning the guide pin 6 by means of a tool inserted in the slot 10. FIG. 5 shows the valve in its fully closed position whereas FIG. 6 illustrates the open position of the valve; the extent to which the valve is opened will be further increased by the continuously acting bimetal disc 20 if the temperature rises beyond the operating temperature of the bimetal snap-action disc 9. The valve part 2 associated with the valve casing contains appropriate openings 22 for passage of the medium the flow of which is controlled by the valve. In this embodiment, the movable valve part 1 takes the form of a solid plate provided with an annular sealing face 23. If the continuously acting bimetal disc 20 is replaced by a bimetal snap-action disc, two different open positions of the valve can be obtained at the attainment of two different operating temperatures. The continuously acting bimetal disc 20 can also be so dimensioned that even before the operating temperature of the bimetal snap-action disc 9 is reached, a continuous slot-like flow passage between the valve parts 1 and 2 is created; when a predetermined higher temperature is reached, the valve will be opened further, and a wider flow passage will be provided, by the action of the bimetal snap-action disc 9. It will thus be appreciated that the valve of this embodiment can be adapted to meet various requirements. FIG. 6 further shows one manner in which the valve can be mounted within a duct 40.

Figure 7:
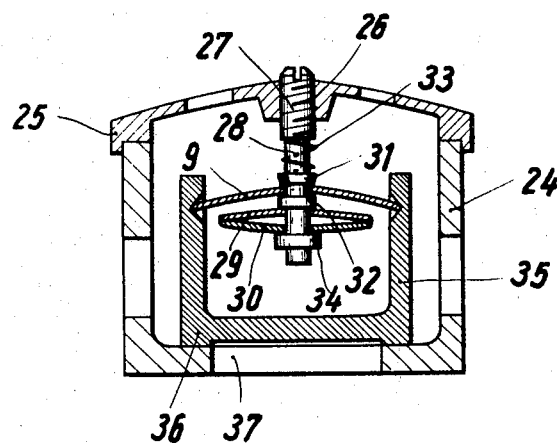
FIG. 7 is a side view of another embodiment of a valve in accordance with the invention, the valve incorporating bimetal cup springs, in the fully closed position.
Figure 8:
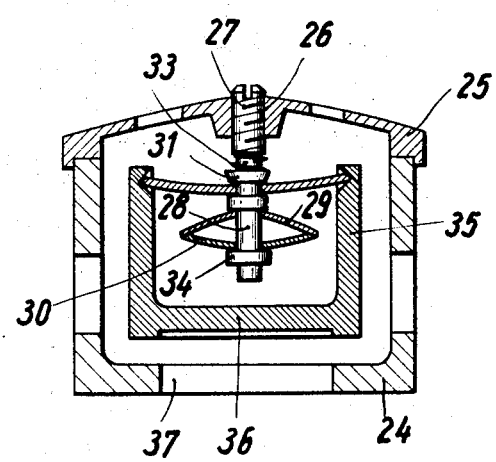
FIG. 8 is a side view of the valve of FIG. 7 in the open position.

The valve of FIGS. 7 and 8 includes a valve part 24 which is associated with the valve casing and is covered by a part 25. Disposed in this cover part 25 is a guide pin 27 which is longitudinally displaceable in a screw-threaded portion 26 of the cover part 25 and incorporates a portion 28 of reduced diameter. A helical compression spring 33, an intermediate member 31, the bimetal snap-action disc 9, an intermediate ring 32 and two bimetal cup springs 29 and 30, are freely displaceable on this reduced diameter portion. A stop 34, connected to the guide pin 27, forms an end-piece for this column of elements. The bimetal snap-action disc 9 engages a movable valve part 35 at appropriate points around its periphery. The valve part 35 embodies a valve plate 36 which, in the fully closed position of the valve illustrated in FIG. 7, bears against the outer and upper edge of a central opening 37 in the valve part 24 associated with the valve casing. Here again, the required combination of surge and proportional characteristics can be obtained by appropriate choice, for the operating temperatures involved, of the continuously acting bimetal cup springs 29 and 30 and the bimetal snap-action disc 9, as well as by using an appropriate biasing action by appropriate turning of the pin 27. The helical compression spring 33 prevents forces from being applied in an undesirable manner in the fully closed position of the valve when the temperature continues to change in a valve closing sense. FIG. 8 illustrates the open position of the valve.

Figure 9:
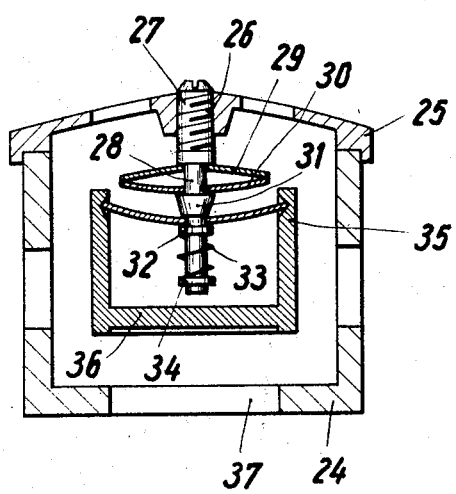
FIG. 9 is a side view of the valve of FIG. 7 with an alternative arrangement of the bimetal cup springs.

In the valve of FIG. 9, the positions of the bimetal cup-springs 29 and 30 and the compression spring 33 have been interchanged compared with the valve of FIGS. 7 and 8. Otherwise, the valve of FIG. 9 is constructed in the same manner as the valve of FIGS. 7 and 8.

It will be appreciated that the bimetal elements will be disposed in the flow path of the medium the flow of which is to be controlled so that these elements will respond to the temperature of the medium.

I claim:

1. A temperature responsive valve for the regulation of the coolant flow in an internal combustion engine comprising a valve part movable between an open position to allow passage of the coolant through the valve and a closed position to prevent passage of the coolant through the valve, and a plate-like bimetal snap-action element responsive to the temperature of the coolant to effect the opening and closing movement of the valve part, said bimetal element being rigidly supported at its periphery and being substantially uniformly domed or dished, and said movable valve part and a fixed valve part associated with an associated valve casing forming a ring valve in which openings are provided in the movable valve part and the fixed valve part, the opening in the movable valve part being offset with respect to the openings provided in the fixed valve part.

2. A temperature-responsive valve comprising a valve part movable between an open position to allow passage of a medium through the valve and a closed position to prevent passage of the medium through the valve, and at least one plate-like bimetal snap-action element responsive, in use of the valve, to the temperature of the medium to effect said opening and closing movement of the valve part, said element being clamped at its periphery and being as a whole substantially uniformly domed or dished, and a further valve part, said further valve part associated with a valve casing and a compensating spring element provided to relieve pressure between the movable valve part and said further valve part.

3. A temperature-responsive valve according to claim 2 including means operatively positioned for adjusting the snap-action bias exerted on the movable valve part when said movable part is in an end position.

* * * * *